United States Patent [19]
Kim et al.

[11] Patent Number: 5,926,572
[45] Date of Patent: Jul. 20, 1999

[54] METHOD OF DETERMINING CODING TYPE AND CODING MODE FOR OBJECT SHAPE CODING

[75] Inventors: Jae-Kyoon Kim; Jae-Won Chung, both of Seoul; Kwang-Hoon Park, Inchon; Joo-Hee Moon, Seoul; Ji-Heon Kwen, Kyongsangnam-do, all of Rep. of Korea

[73] Assignee: Hyundai Electronics Ind Co., Ltd., Kyoungki-do, Rep. of Korea

[21] Appl. No.: 08/740,299

[22] Filed: Oct. 25, 1996

[30] Foreign Application Priority Data

Oct. 26, 1995 [KR] Rep. of Korea ............... 95-37921

[51] Int. Cl.$^6$ ........................................... G06K 9/36
[52] U.S. Cl. ................ 382/238; 382/232; 382/236; 438/413; 438/416
[58] Field of Search ............................. 382/232, 236, 382/238; 348/402, 416, 431, 413; 341/67

[56] References Cited

U.S. PATENT DOCUMENTS

| 4,546,386 | 10/1985 | Matsumoto et al. | 348/412 |
| 5,510,840 | 4/1996 | Yonemitsu et al. | 348/402 |
| 5,563,593 | 10/1996 | Puri | 341/67 |
| 5,608,458 | 3/1997 | Chen et al. | 348/413 |
| 5,657,087 | 8/1997 | Jeong et al. | 347/416 |

*Primary Examiner*—Jose L. Couso
*Assistant Examiner*—Anh Hong Do
*Attorney, Agent, or Firm*—McAulay Nissen Goldberg Kiel & Hand, LLP

[57] ABSTRACT

A method for determining a coding type and a coding mode for object shape coding is disclosed. A coding mode is determined according to the characteristic of an object and shape, and the shape is coded by varying a coding method according to the determined coding mode.

7 Claims, 2 Drawing Sheets

— 5,926,572 —

METHOD OF DETERMINING CODING TYPE AND CODING MODE FOR OBJECT SHAPE CODING

BACKGROUND OF THE INVENTION

The present invention relates to a method for determining a coding type and a coding mode for object shape coding of an object-oriented video compressing technique in video compressing techniques which take aim at multimedia services of very low bit rate transmission such as video telephone and video conference services through a public switched telephone network and a mobile radio communication network. More particularly, the present invention relates to a method for determining a coding type and a coding mode for object shape coding which compresses an image by determining the coding mode based on the characteristic of an object and shape and varying a coding method according to the determined coding mode.

Generally, H.261 for providing video telephone and video conference services using an integrated services digital network (ISDN), and H.263 for providing the video phone service using a public switched telephone network (PSTN) have internationally been standardized. However, since H.261 and H.263 supplying a moving picture of a very low bit rate such as a video telephone have poor picture quality, the necessity of improving picture quality has been increased. As techniques related to the moving picture, there have been proposed MPEG1 (moving picture expert group 1) for DSM (digital storage media), and MPEG2 for DSM, HDTV (high definition television), ATV (advanced television), etc. However, H.261, H.263, MPEG1 and MPEG2 techniques adopt a coding method based on a block and thus the picture quality remarkably deteriorates in application to the very low bit rate transmission. To overcome this disadvantage, MPEG4 takes an access of a new method different from a conventional coding method, and various coding methods such as subband coding, region based coding, model based coding, object oriented coding, etc. are being considered.

In conventional shape coding using polygon and spline, instead of classifying circumstances according to the characteristic of an object or similarity between object shape, only a case having a small error value is selected by calculating an error of the shape between a motion-compensated predictive image of the previous image and the original image. Consequently, since a coding mode corresponding appropriately to circumstances is not set, unnecessary processing processes occur and coding gain deteriorates.

SUMMARY OF THE INVENTION

It is an object of the present invention to provide a method for determining a coding type and a coding mode for object shape coding which can raise a coding gain and improve subjective picture quality by varying a coding method according to the coding mode determined on the basis of the characteristic of an object and shape and by selecting the coding type having a high coding gain according to circumstances.

In accordance with one aspect of the present invention, a coding mode is determined according to the characteristic of an object and shape, and the shape is coded by varying a coding method according to the determined coding mode.

The present invention is more specifically described with reference to the attached drawings.

BRIEF DESCRIPTION OF THE ATTACHED DRAWINGS

FIG. 1 is a schematic diagram of a shape coding system applied to the present invention; and FIG. 2 is a flow chart showing a method for determining a coding type and a coding mode for object shape coding according to the present invention.

DETAILED DESCRIPTION OF PREFERRED EMBODIMENT

Figure 1:
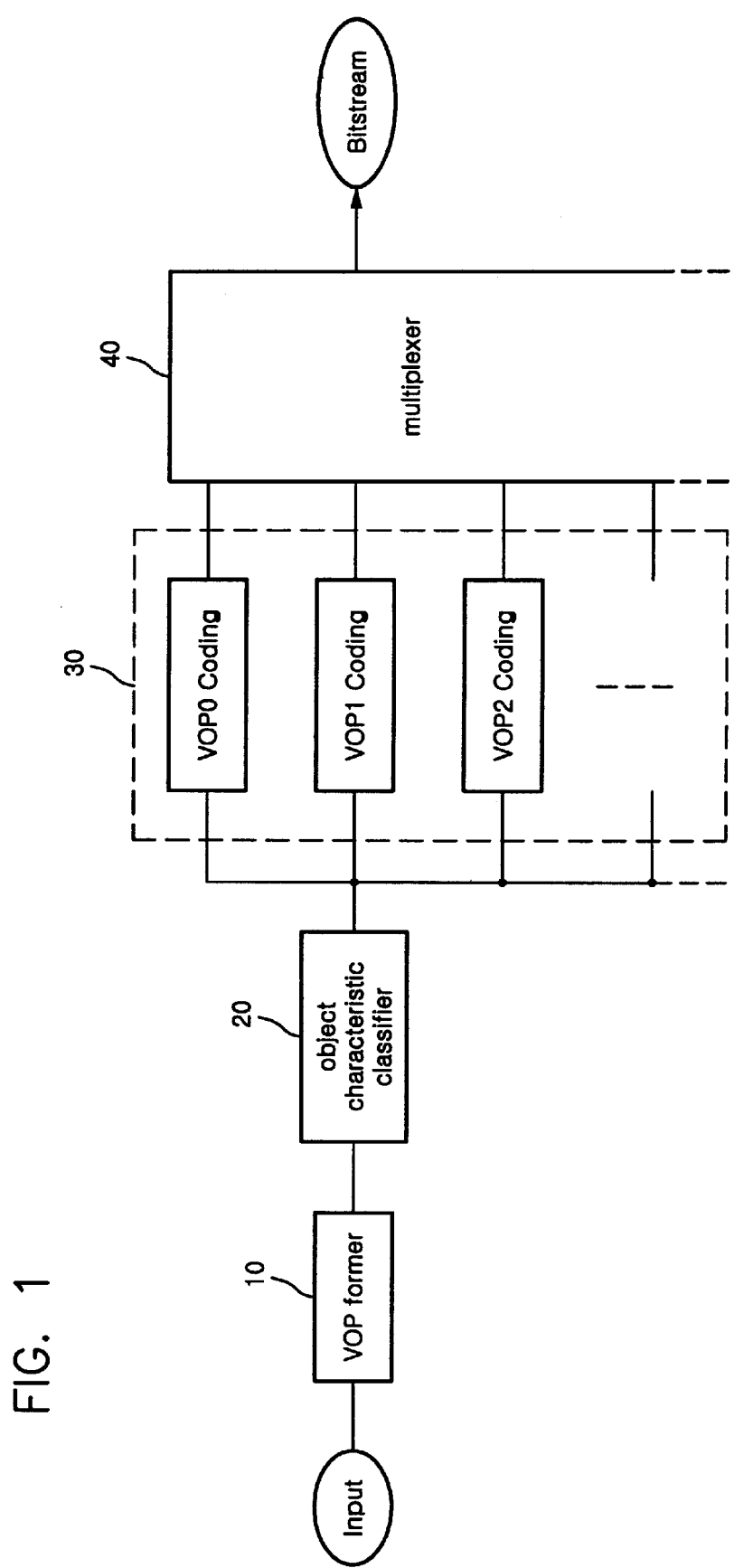

Referring to FIG. 1, a VOP (video object plane) former 10 determines an image to be coded from an input image of one frame. An object characteristic classifier 20 classifies the characteristic of an object from object shape obtained from the VOP former 10. A coder 30 having a plurality of coding portions codes the object shape obtained from the object characteristic classifier 20 by using different coding methods. A multiplexer 40 multiplexes the image coded from the coder 30 and generates the multiplexed image as a form of bit stream.

Figure 2:
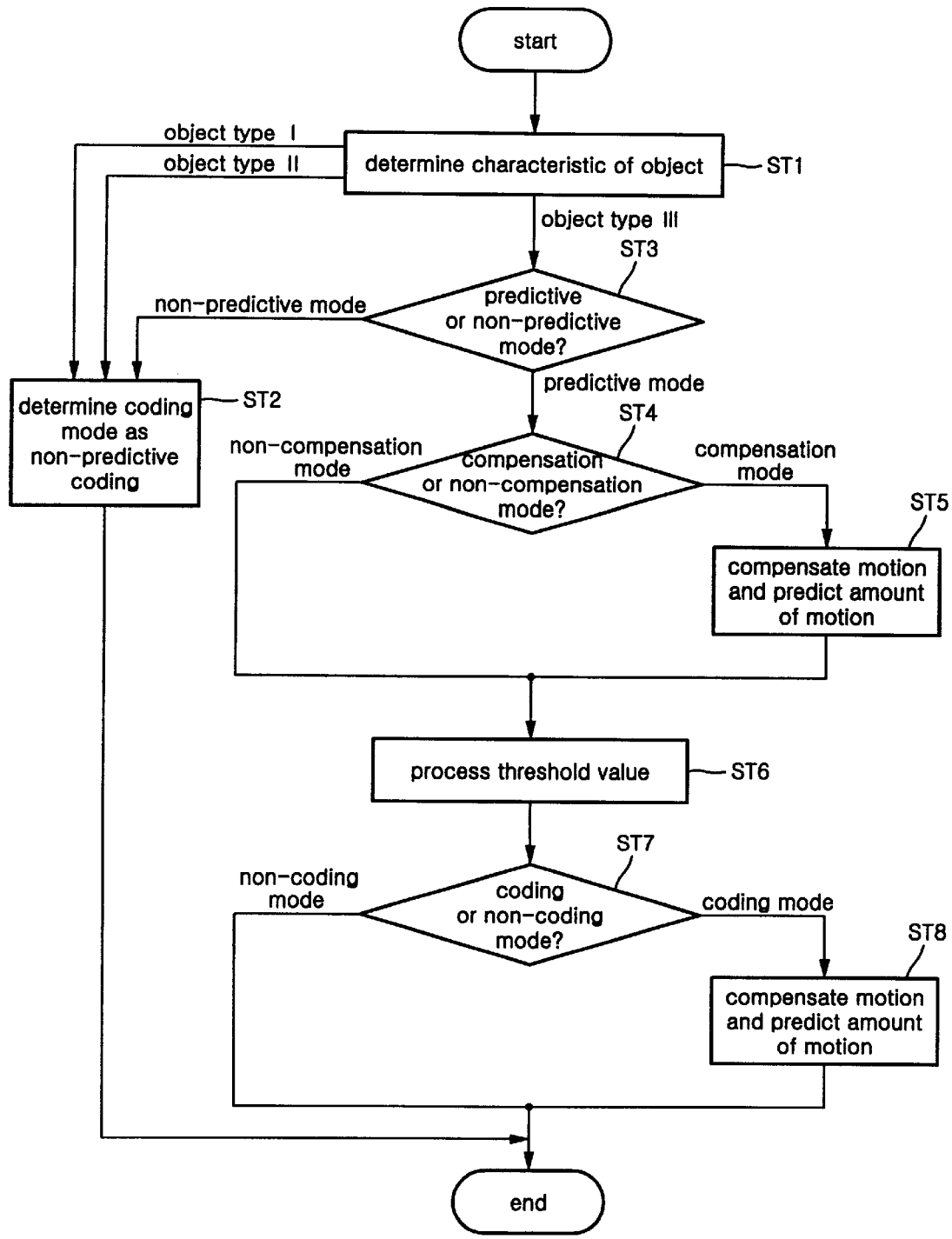

FIG. 2 illustrates a method for determining a coding type and a coding mode for object shape coding. The characteristic of the object is determined from any coding object shape of the VOP former 10 (step ST1). If the object does not exist at a previous frame and appears at a current frame (object type I), or if the object is relatively smaller than a threshold value in size (object type II), the coding type is determined as an intra mode and the coding mode is determined as intra shape coding (step ST2). If the object exists at both the previous frame and the current frame and if the object is relatively larger than the threshold value in size (object type III), similarity between the object shape is checked (step ST3). If there is no similarity between the object shape, the coding type is determined as a non-predictive mode. If there is similarity between the object shape, the coding type is determined as a predictive mode and whether motion is compensated is determined according to the amount of motion of the object (step ST4). If the amount of motion of the object is less than a setting value, the coding type is determined as a non-compensation mode and a threshold value is processed (step ST6). If the amount of motion of the object is greater than the setting value, the coding type is determined as a compensation mode. Then the motion is, compensated (step ST5) and the threshold value is processed (step ST6). If the processed threshold value is less than the reference value, the coding type is determined as a non-coding mode. If the threshold value is greater than the reference value, the coding type is determined as a coding mode and contour predictive coding is performed (step ST8).

The schematic concept of the present invention will now be described in brief. In conventional signal information coding, the coding mode and the coding type combined therewith are introduced to obtain the coding gain. This concept is applied to the shape coding of which necessity is being stressed to obtain the coding gain. In a preferred embodiment of the present invention, the shape coding type having a high coding gain (high information compression rate) is selected according to various circumstances, while the conventional shape coding has one coding method.

In operation, if an image of one frame is supplied through video input means, the VOP former 10 classifies the image within one frame according to the object and transmits the classified image to the object characteristic classifier 20. The object characteristic classifier 20 determines an object type by analyzing the shape of the object. The shape coding is differently selected according to the characteristic of the object within the frame on a temporal axis. For example, an object which does not exist at the previous frame and appears at the current frame is an object type I. An object type II is an object which is relatively very less than the threshold value in size, for example, an object less than 10 pixels. An object type III is an object which is relatively very greater than the threshold value in size, for example, an object greater than 10 pixels.

The object which does not exist at the previous frame and appears at the current frame and the object having its size less than 10 pixels are determined as an intra mode in the coding type and the intra shape coding is applied (step ST2).

If the object is greater than 10 pixels in size and exists at the previous and current frames, the similarity between the object shape is checked and the coding type is determined according to the mutual similarity.

If the similarity between the object shape is small, the coding type is determined as the non-predictive mode (intra mode) and the intra shape coding (that is, to perform the coding only by the shape within a current image) is performed. If the similarity between the object shape is large, the coding type is determined as the predictive mode (inter mode) and the motion is estimated.

As criteria for discriminating the similarity between the object shape, parameters are used respectively or by combination, such as a contour length, diameter of boundary, curvature, skeleton, convex, shape number, area, perimeter, the number of mask difference pixel, compactness, principle axis of region, topology, Euler number, Fourier description, etc.

If the coding type is determined as the predictive mode, that is, if the similarity between the object shape is large and if the object moves along the temporal axis, since it is possible to predict motion information, the amount of motion is estimated and its estimated value is compared with a setting value for discriminating whether the motion is compensated. If the estimated value is smaller than the setting value, that is, if the amount of motion of the object is very small, the coding type is determined as the non-compensation mode in order to raise the coding gain. Hence, the unnecessary processing process for the compensation of motion is eliminated. If the estimated value is larger than the setting value, that is, if the amount of motion of the object is large, the coding type is determined as the compensation mode and the motion compensation is executed the reference shape.

Meanwhile, there are regions generating a shape predictive error when the predicted shape is overlapped on the original shape, an error is generated by mismatch between them when the coding type is the motion compensation mode or the motion non-compensation mode. Among these regions, there are regions which have no effect on subjective picture quality when the shape is reproduced even though the regions are not transmitted, such as a line-like region and a small error region. Since there is no deterioration in the subjective picture quality even though these regions are not transmitted, it is desirable not to transmit these regions in an aspect of the coding gain. Furthermore, there are regions generated when original shape is wrong due to an object extraction problem. These error regions are undesirable during transmission in the subjective picture quality as well as the coding gain. Therefore, there is no need to transmit these error regions. Consequently, a process for selecting regions which need transmission is required and this process is a thresholding operation (step ST6). The thresholding value for the error regions is processed through this thresholding operation. The threshold value of the processed error region is compared with the reference value for determining whether the coding is performed. If there is an error region which needs transmission, that is, if the threshold value of the processed error region is greater than the reference value, the coding type is determined as the coding mode. If the threshold value of the processed error region is less than the reference value, the coding type is determined as the non-coding mode not to perform the coding. If the coding type is determined as the coding mode, the contour predictive coding is implemented (step ST8). Thus, the coding mode and the non-coding mode are determined by checking whether the error region has an effect on the subjective picture quality. Therefore, the unnecessary processing process can be eliminated and the overall coding gain is favorable.

As described above, the various circumstances generated when the object shape is coded are classified according to the mode. The selective coding is implemented by determining the coding type from the selected mode. Therefore, the efficient shape coding is possible and it is useful in video compression since the coding gain is increased. Moreover, when the image is reproduced, the picture quality can be improved by applying the appropriate coding method according to circumstances.

What is claimed is:

1. A method for coding an object shape comprising the steps of:

reading information of an object shape and determining the object shape as a non-predictive mode (intra mode) when it does not exist at a previous frame and appears at a current frame and when it is smaller than a threshold value in size although it appears at a previous frame and a current frame;

checking a similarity between the object shapes at a previous frame and a current frame when it appears at a previous frame and a current frame and is larger then the threshold value in size, determining the object shape as the non-predictive mode if the similarity is small and the object shape as a predictive mode (inter mode) if the similarity is large;

estimating an amount of motion between the object shapes at a previous frame and a current frame in the predictive mode, comparing an estimating value with a setting value, determining the object shape as a non-compensation mode when the estimating value is smaller than the setting value and as a compensation mode when the estimating value is larger than the setting value; and checking error regions among the predicted objects at the current frame and the original objects.

2. A method as claimed in claim 1, wherein criteria of the similarity use parameters respectively or by combination, such as a contour length, diameter of boundary, curvature, skeleton, convex, shape number, area, perimeter, the number of mask difference pixel, compactness, principle axis of region, topology, Euler number, Fourier description.

3. A method as claimed in claim 2, wherein said threshold value is 10 picture elements.

4. A method as claimed in claim 2, wherein the shape is coded by using a contour predictive coating technique when the object shape is determined as the coding mode.

5. A method as claimed in claim 1, wherein said threshold value is 10 picture elements.

6. A method as claimed in claim 5, wherein the shape information is coded by using a contour predictive coating technique when the object shape is determined as the coding mode.

7. A method as claimed in claim 1, wherein the shape is coded by using a contour predictive coding technique when the object shape is determined as the coding mode.

* * * * *